Jan. 16, 1940.　　　　E. B. FISH　　　　2,187,119
IRRIGATION PIPE AND COUPLING
Filed Jan. 17, 1938　　　2 Sheets-Sheet 1

Inventor
EUGENE B. FISH
By Hazard and Miller
Attorneys

Jan. 16, 1940.  E. B. FISH  2,187,119
IRRIGATION PIPE AND COUPLING
Filed Jan. 17, 1938  2 Sheets-Sheet 2
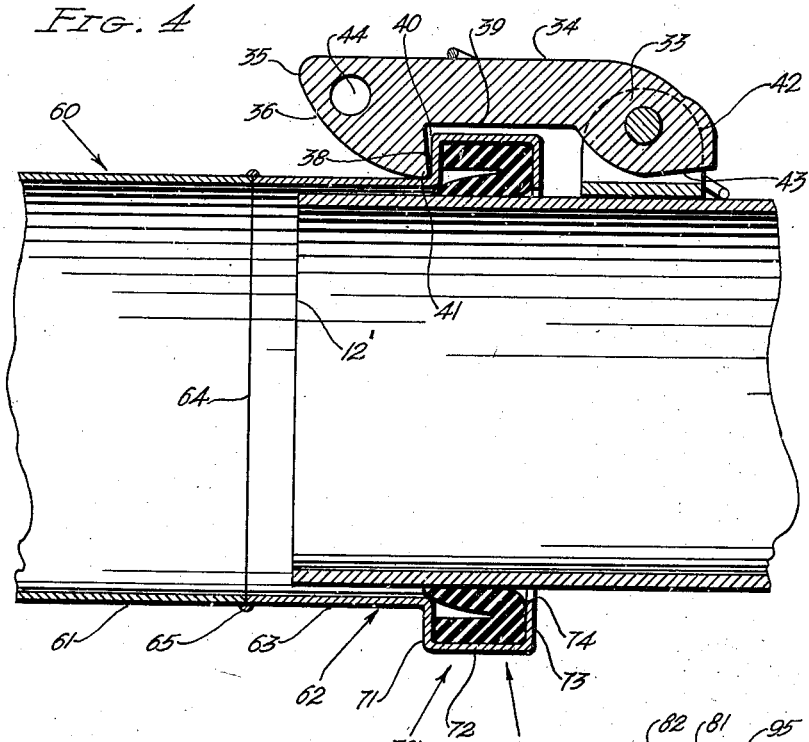
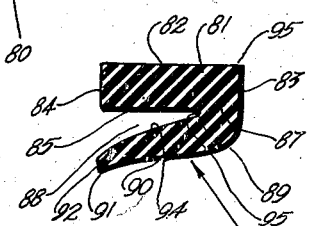
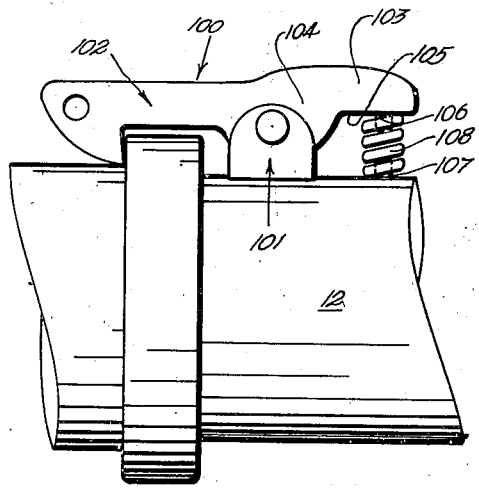
Inventor
EUGENE B. FISH
By Hazard and Miller
Attorneys Patented Jan. 16, 1940

2,187,119

UNITED STATES PATENT OFFICE 2,187,119

IRRIGATION PIPE AND COUPLING

Eugene B. Fish, Los Angeles, Calif., assignor to West Coast Pipe & Steel Company, Los Angeles, Calif., a corporation of California Application January 17, 1938, Serial No. 185,400

2 Claims. (Cl. 285—173)

My invention pertains to certain improvements in readily connectable and disconnectable irrigation pipe principally of a type used for the overhead spray system in which the length of pipe after overhead irrigation by overhead spray of a certain area is moved by sections to another area to be irrigated. In such construction it is necessary to have a readily connectable and disconnectable joint or coupling so that the sections of pipe may be moved from one place to another and quickly reassembled in the pipe line and also on account of the more or less rough handling, it is necessary that the pipes and coupling unit from which the standpipe of the spray extends have adequate strength but still are of quite light material. In some types of irrigation pipe assemblies the coupling unit in which the standpipe from which the water spray extends, is made of cast aluminum in order to provide sufficient lightness but this has a disadvantage in that the castings are readily broken and as it is necessary to provide a latch to secure a pipe section to the coupling unit, the breakage frequently occurs adjacent the latch due to a levering action of the pipe on a coupling unit.

One of the objects and features of this present invention includes a coupling unit which if desired may have a connection for a standpipe of a water spray and in which the pipe part of the unit is formed of steel pipe. This may be comparatively thin and yet have adequate strength. In order to support the unit above the ground I preferably employ a saddle construction with a shoe to rest on the soil. As this together with the clamps or latches may be comparatively light, the assembled structure has materially greater strength than the cast aluminum coupling units of approximately the same capacity.

Another feature of my invention relates to the latch construction operating in conjunction with an annular socket on the end of connecting pipes in order to loosely connect such pipes to the center coupling unit. In this connection a further detail feature of my invention uses a spring pressed latching dog which is pivoted to the coupling unit and has a detent to engage over the socket structure of the connecting pipe. This allows quick assembly of the connecting pipe with the coupling unit.

Another object and feature of my invention relates to the socket and expansible gasket construction in reference to the coupling unit. Such coupling unit as above mentioned is formed of a section of steel pipe and this is of constant diameter from one end to the other. The connecting pipe has a socket end structure and adjacent the annular socket is cylindrical and of slightly larger diameter than the pipe with the coupling unit in order to be readily fitted over the end of the coupling unit pipe. The expansible gasket is carried by the annular socket of the connecting pipe, hence when the connecting pipe is thrust over the end of the pipe to the coupling unit, the rubber gasket or ring which is of a split type is compressed and when the latch engages the annular socket the gasket is held approximately in a stationary position. The pressure of water flowing through the assembled pipes expands the gasket and makes the water tight seal at the annular space between the end portion of the connecting pipe on the outside and the steel pipe of the coupling unit on the inside. In this connection my invention also includes an improvement in the form of the rubber gasket, this having a substantial and thick body with cylindrical outside and inside portions, the inside portion being at an annular slit whereby the gasket has a tongue, the inside portion terminating in a blunt edge, such blunt edge portion contacting the pipe of the coupling unit.

A further object and characteristic of my invention resides in providing a relatively strong and inexpensive coupling pipe which may be made of standard steel or equivalent pipe, cylindrical from end to end and without any special shaping or other deforming of a standard article of commerce. By using a pipe of this character I develop a coupling pipe much stronger than the ordinary hollow castings used in irrigation pipe systems of the overhead spray type. This coupling pipe is properly supported by a stand to raise it above the ground and is provided with equipment for attaching a standard pipe for a spray head. Another feature of my invention is developing a connecting pipe for connecting between two coupling pipes of a type which may be of sufficiently light weight to be readily moved from place to place by hand in shifting an irrigation line and yet sufficiently strong at the ends where the joint is made to resist distortion, therefore one of the characteristics of my invention is in the formation of an outwardly extending socket structure having the same thickness of metal as the adjacent portion of the connecting pipe. This forms an annular structure at each end of the connecting pipe which materially stiffens such pipe to resistance of distortion from a true cylinder, manifestly permitting the use of a lighter pipe and having adequate strength.

Another feature of my invention is in having the annular socket structure perform at least an additional function in that through the medium of the latching assembly which is mounted on the coupling pipe, a latch like device may engage the annular socket structure and thus I utilize such socket structure to prevent separation of the two pipes when the connecting pipe is fitted over the ends of the coupling pipe.

The socket structure also provides another third function for the accommodation and seating of an annular cup type of expansion gasket which has the characteristics that under the internal pressure developed by a fluid in the pipes when made into a joint, forms a seal between the coupling and connecting pipes, therefore a characteristic feature of my invention is that the annular socket structure performs at least three separate and distinct functions of operating in combination.

My invention is illustrated in connection with the accompanying drawings in which:

Fig. 4 is a vertical longitudinal section as if taken on the line 4—4 of Fig. 2 in the direction of the arrows.

Fig. 5 is a longitudinal section through the rubber gasket in an expanded position.

Fig. 6 is an elevation similar to Fig. 1 showing an alternative latch construction.

Figure 1:
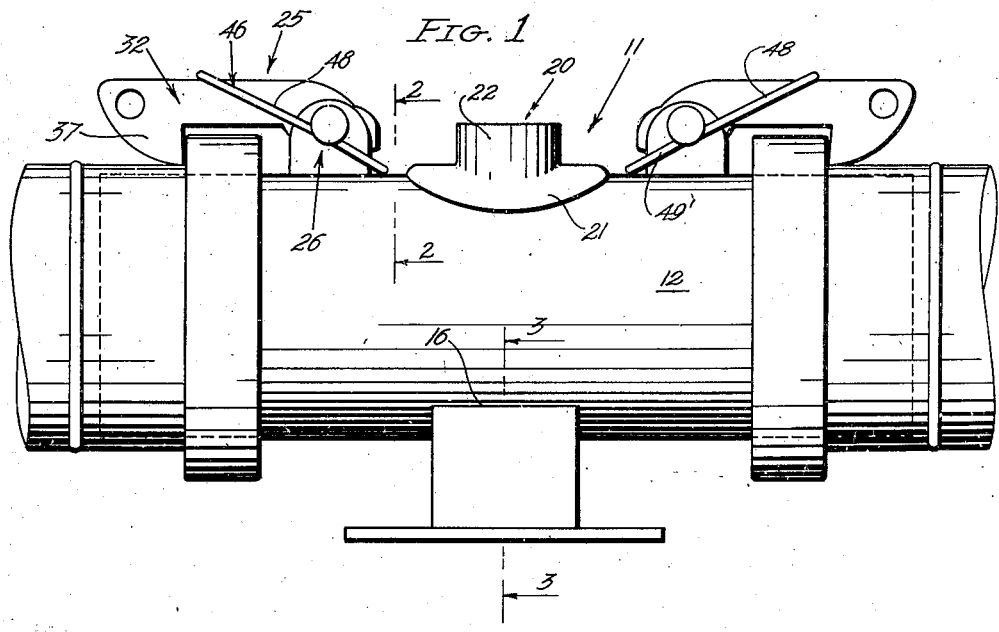
Fig. 1 is a side elevation showing a spray head coupling pipe with end connecting pipes in the operative latched position.
Figure 2:
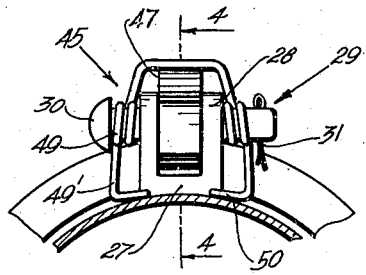
Fig. 2 is a partial transverse section on the line 2—2 of Fig. 1 showing in particular an end view of the latch.
Figure 3:
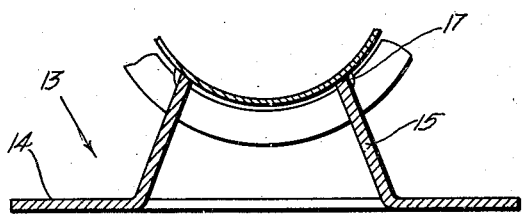
Fig. 3 is a partial transverse section on the line 3—3 of Fig. 1 showing a base and shoe support for the coupling pipe.

In my invention I employ a coupling unit 11 which has a coupling pipe 12. This pipe is cylindrical and preferably made of a good quality of steel so that the pipe may be made comparatively thin and yet have adequate strength. The pipe is preferably of the same external and internal diameter from end to end and at each end 12' is cut transverse to the axis of the pipe, there being no bevel on the end of the pipe or no slight taper externally. The pipe length is preferably mounted on a base 13 which has a shoe plate 14 and upwardly bent leg sections 15, these being formed by slitting a flat plate and bending them upwardly to have a longitudinal contact and joint 16 with the lower portion of the pipe, this joint having a weld 17. The pipe section is thus quite rigid and secured to the base which is in effect a saddle support and retains the pipe section a desired distance above the ground. The shoe area is sufficient to provide a proper support even on soft ground for the pipe unit 12 and the connecting pipes. Where the irrigation pipe is used for overhead spray I provide a pipe connection 20. This is provided with a saddle 21 welded to the pipe around an outlet opening, there being a neck 22 preferably internally threaded to receive a vertical standpipe leading to a spray head.

The securing means for attaching a connecting pipe to the coupling pipe includes a pair of latch assemblies 25. These are preferably both the same. They include a bracket 26 having a base 27 welded to the top of the pipe 12, there being ears 28 extending upwardly from the base and a pivot pin 29 through the ears. This pin is of a simple rivet type having a head 30 and an opposite end with a cotter pin 31 extending therethrough. The latch dog 32 has a center or hub portion 33 with a perforation and pivoted on the pivot pin 29. This preferably has a normally horizontal upper edge 34, a more or less pointed tip 35, a convex curved cam end 36, this forming part of the detent 37 of the latch dog. Such detent has an abutment end 38. This joins an undersurface 39 making an angle 40 slightly less than a right angle. By this construction when the latch dog is substantially horizontal, there is a slight inclination upwardly and away from the transverse center of the pipe from the contact lower edge 41. The latching dog has a projecting end 42. This has an undersurface 43 which may tilt downwardly and engage the base 27 of the bracket 26 and thus limit the upward tilt of the latch dog. The outer end adjacent the detent portion is provided with a perforation or eye 44 in which the operators assembling and disassembling a pipe line may insert a hook to release the latch dog from an adjacent section of pipe hereunder described. A pressure spring assembly 45 includes a wire yoke 46 having an end 47 extending over the top surface 34 of the latch dog. There are two side arms 48, a helical twist 49 around the pin 29, extending leg portions 49' and contacting inwardly bent ends 50 which engage the upper surface of the pipe 12 adjacent the bracket 26 and thus urge the latch dog into the latching position of Figs. 1 and 4.

A connecting pipe designated by the numeral 60 is preferably made up of a pipe length 61 of thin steel piping and an end assembly 62 having a pipe section 63 of the same diameter as the pipe 61 and meeting at a butt joint 64 which is secured by a peripheral weld 65. The end assembly is provided with an annular socket 70 which has a latching shoulder 71 formed in a plane at right angles to the axis of the pipe assembly 60 including the pipe section 61 and the pipe section 63. The socket has a peripheral section 72 which is cylindrical and concentric to the axis of the pipe unit 60. An inwardly turned abutment flange 73 is also transverse to the axis of the pipe assembly and is thus parallel to the latching shoulder 71. This flange has an opening 74 which is equal to or slightly greater in diameter than the inside surface of the pipe section 63.

The cup rubber gasket designated by the assembly numeral 80, note particularly Figs. 4 and 5, has an annular band section 81 which is cylindrical on its peripheral face 82, the outer edge 83 and the inner edge 84 are at right angles to the axis of the gasket and hence to the pipe and socket in which the gasket is fitted. The band section has an inside surface 85 concentric with its peripheral surface 82. The contracting and seal forming flap 86 is connected by a substantial wall thickness 87 at the base of the slit or split of the cup 88 and has a rounded corner 89 extending from the outer edge 83. In the normal open and unstrained position the outside surface 90 of the flap has a slight reverse curve bringing the tip 91 in substantial alignment with the plane of the end 84. A relatively thick end edge 92 extends outwardly from the pointed edge 91 and a section having a convex curve 94 extends to the base 95 of the split 88 at the junction of the surface 85 of the band section and 94 of the flap section.

In fitting the gasket in the socket structure 70, the pipe and the coupling unit must be disconnected, then the peripheral surface 82 fits snug against the outside or cylindrical portion 72 of the socket. The outer or base edge 83 fits against the abutment flange 73, the inner edge 84 fits against the latching shoulder 71. This allows the flap portion to extend due to its natural resiliency well inside of the cylindrical inside surface of the pipe section 63 from which the socket is formed. Then when a pipe such as a connecting pipe 60 is fitted over the pipe 12 of the coupling unit, the end 12' first engages the cup packing ring slightly inside of the curved edge 89. The flap is forced inwardly and so that the inner part of the surface 90 adjacent the edge 91 engages the pipe 12 and this inner edge is brought slightly beyond the latching shoulder 71 of the socket 70 when the pipe is normally latched.

In latching a pipe section the operators or men handling the pipe generally use a hook which may be caught in the perforation 44 of the latch dog and this may be tilted upwardly, the limit of the tilt being defined by the undersurface 43 of the projecting end 42 contacting the base 27 of the bracket 26. Moreover the rounded nose surface 36 of the detent end 37 in riding over the socket structure tends to raise the latch dog when the two pipe sections are fitted together. The connecting pipe 60 may be forced over the pipe 12 until the abutment flange 73 engages the bracket 26 if desired, however the latch is completed as soon as the abutment end 38 rides over the shoulder 71. The slight outward bevel of the surface 38 of the abutment end is to accommodate a slight tilting of the pipes when connected. On account of the connecting pipe 60 with the end 63 being of slightly greater internal diameter than the external diameter of the pipe 12, there can be a slight tilt at the connection and in this tilt the end of the flap adjacent the blunt portion 92 may be gripped by the inside corner of the latching shoulder 71. The split of the cup washer is sufficiently exposed however in all the circumstances so that when the assembled pipe is under water pressure the water is forced into the cup-like split 88 and expands the flap 86 outwardly so that the portion adjacent the edge 91 forms a water tight seal with the outside surface of the coupling pipe 12. Usually when there is pressure on the pipes the latch dog engages the socket 70 contacting the shoulder surface 71 and on account of this surface being at right angles to the axis of the coupling pipe 12, a non-slipping grip is obtained and thus the connecting pipes are prevented from being forced by the internal pressure off of the coupling pipe 12.

In Fig. 6 I illustrate an alternative form of latch designated by the numeral 100. This employs a bracket 101, similar to the bracket 26. The latch dog portion 102 is of the same general construction as that shown in Figs. 1 and 4. However, the rear projecting end 103 is raised from the hub section 104 and has a flared undersurface 105 from which there is a downwardly extending pin 106 complementary to a pin 107 on the pipe 12. A coil compression spring 108 is fitted on these pins and abuts against the pipe and undersurface 105 on the latch, thus forcing the detent end of the latch towards the pipe to grip the socket of the connecting pipe. In this arrangement the two pins in contacting limit the opening movement of the latch dog, the pipes otherwise being connected together in the same manner as described in connection with Figures 1 through 5.

A relatively important feature of my invention as it relates to the strength of a run of irrigation pipe resides in having the individual connecting pipes 60 constructed with the annular socket 70 at each end. Each socket is in the form of a transverse circular channel and manifestly materially adds to the strength of the pipe adjacent the ends. In use of irrigation pipe they are frequently subjected to rough handling as in unloading from a truck in which frequently the whole pipe is merely dumped onto the ground or one end allowed to drop, therefore the annular socket gives additional strength and prevents distortion of the cylindrical end of the connecting pipe lengths. Moreover there is very little danger of the coupling pipes 12 being distorted as these can be made of heavier material and are of quite short length.

In addition to the annular socket structure 70 thus strengthening the connecting pipe 60 as above mentioned, this also has a second function of housing the expansible cup gasket 80 which on expansion forms the fluid tight seal between the coupling pipe and the connecting pipe and the latching shoulder 71 is engaged by the lapped over or extended tip edge of the flap 86. Therefore when the pipes are inclined at an angle one to the other, a portion of the edge of the flap is engaged between the coupling and connecting pipes. A further and important function of the annular socket 70 is that the latching shoulder 71 is engaged by the detent end 37 of the latch and thus the annular shoulder has this additional function whereby it is not necessary to have some separate element whose only function is to engage a latch. On account of the substantially line contact of the edge 41 of the detent with the latching shoulder 71, a slight inclination of the coupling and connecting pipes is permitted and thus tilt can take place in the nature of a pivoting on account of the circular opening 74 being slightly greater in diameter than the inside of the connecting pipe.

Various changes may be made in the details of the construction without departing from the spirit or scope of the invention as defined by the appended claims.

I claim:

1. A pipe connection for irrigation pipes and the like comprising a male pipe member, a female member adapted to receive an end of said male pipe member, the female member being of substantially uniform wall thickness and being bent radially outward adjacent its end to form internally a gasket-receiving recess and externally an annular latch-engaging shoulder and a hooked latch mounted on the male member adapted to lockingly engage said shoulder at any point in its periphery.

2. A coupling for irrigation pipes adapted to be telescopically received in adjacent female pipe members, said female pipe members, each being of substantially uniform wall thickness and being bent radially outward adjacent one end to form internally gasket-receiving recesses, and externally annular latch-engaging shoulders, and hooked latches mounted on the coupling and adapted to lockingly engage said shoulders at any point in the periphery thereof and a supporting base including a flat shoe plate, legs bent upwardly from said plate and forming two longitudinal joints parallel to its axis with longitudinal welds at said joints.

EUGENE B. FISH.